US012774122B2

(12) United States Patent
Docken et al.

(10) Patent No.: US 12,774,122 B2
(45) Date of Patent: Oct. 27, 2026

(54) PROCESSING A USED CONTAINER

(71) Applicant: INDUSTRIAL CONTAINER SERVICES, LLC, Atlanta, GA (US)

(72) Inventors: Kevin Docken, Atlanta, GA (US); Loren Flynn, Atlanta, GA (US); Matt Jackels, Atlanta, GA (US); Gerald P. Butler, Jr., Atlanta, GA (US)

(73) Assignee: INDUSTRIAL CONTAINER SERVICES, LLC, Atlanta, GA (US)

(*) Notice: Subject to any disclaimer, the term of this patent is extended or adjusted under 35 U.S.C. 154(b) by 0 days.

(21) Appl. No.: 19/331,680

(22) Filed: Sep. 17, 2025

(65) Prior Publication Data

US 2026/0015117 A1 Jan. 15, 2026

Related U.S. Application Data

(63) Continuation of application No. 18/634,522, filed on Apr. 12, 2024, now Pat. No. 12,459,687, which is a continuation of application No. PCT/US2022/046678, filed on Oct. 14, 2022.

(60) Provisional application No. 63/255,716, filed on Oct. 14, 2021.

(51) Int. Cl.

*B65B 13/20* (2006.01)
*B23D 53/02* (2006.01)
*B65B 63/02* (2006.01)
*B65B 65/00* (2006.01)

(52) U.S. Cl.

CPC ............ *B65B 13/20* (2013.01); *B23D 53/026* (2013.01); *B65B 63/02* (2013.01); *B65B 65/003* (2013.01)

(58) Field of Classification Search

None

See application file for complete search history.

(56) References Cited

U.S. PATENT DOCUMENTS 5,967,012 A * 10/1999 Dummer .................. B09B 3/35
30/448

FOREIGN PATENT DOCUMENTS

| | | | | |
|---|---|---|---|---|
| EP | 1375382 A1 * | 1/2004 | | B65D 77/0466 |
| EP | 1375382 B2 | 7/2013 | | |
| WO | WO-2017137860 A1 * | 8/2017 | | B23D 47/047 |

* cited by examiner

*Primary Examiner* — Tanzim Imam

(74) *Attorney, Agent, or Firm* — Michael Best & Friedrich LLP

(57) ABSTRACT

A container processing station, which is configured to receive and process a container including a first closable access and a second closable access, includes a processing path extending between a container entrance and a container exit, the processing path having a first branch and a second branch different from the first branch. The container processing station further includes a dissecting tool positioned along the processing path, the container being separable by the dissecting tool into a first portion having the first closable access and a second portion having the second closable access. The container processing station further includes a folding arm adjacent the first branch and operable to fold the first portion, thereby reducing a volume of the first portion, and a cutting tool adjacent the second branch and operable to remove the second closable access from the second portion.

9 Claims, 3 Drawing Sheets

PROCESSING A USED CONTAINER

CROSS REFERENCE TO RELATED APPLICATIONS

This application is a continuation of, and claims the benefit of and priority to, U.S. Utility patent application Ser. No. 18/634,522, filed Apr. 12, 2024, now U.S. Pat. No. 12,459,687, and entitled "Processing a Used Container," which is a continuation of, and claims the benefit of and priority to, International Patent Application No. PCT/US2022/046678, filed Oct. 14, 2022, and entitled "Processing a Used Container," which claims the benefit of, and priority to, U.S. Provisional Patent Application No. 63/255,716, filed Oct. 14, 2021, entitled "Processing a Used Container," and German Patent Application No. 202021003201.0, filed Oct. 14, 2021, the disclosures of which are incorporated by reference in their respective entireties as if the same were fully set forth herein.

TECHNICAL FIELD

The disclosure relates to a method and a station device for processing a used container, a processing path comprising an afore-mentioned station and a use of a station for processing a used container.

BACKGROUND

The process of reconditioning, disposal or reuse of used containers, or even parts thereof, is associated with problems. The work is labor-and personnel intensive, and involves risks to the workers crushing and/or cleaning the container. In particular, exposure of the workers to residual content present in the containers may present health hazards. Therefore, there remains a need for processing a container in a manner that is safe in terms of the health of the workers and/or allows a large number of containers to be processed in relation to the number of workers and/or time.

Regarding large containers, it is known that a worker manually pushes the container through a bandsaw to produce a bottom portion of the container and a top portion of the container. A residual product is manually scraped out of the bottom portion by a worker. The top portion of the container is again manually pushed through the bandsaw to produce a top portion and a middle portion. The middle portion of the container is then removed, manually folded and fed into a baler. The top and bottom portion of the container are also manually loaded into the baler until the baler is full.

BRIEF SUMMARY

The invention provides a station for processing a used container. Further, the invention provides a processing path comprising at least one afore-mentioned station. Additionally, the invention provides a use of at least one station for processing of a used container. Moreover, the invention provides a use of at least one robot in a afore-mentioned station.

Provided is a method of processing a used container. The used container comprises a rigid container wall having at least a first and a second surface, the first and the second surface extending in different planes. The first surface comprises a first opening and the second surface comprises a second opening. The first opening and the second opening are part of a first and a second closable access to the container, respectively. According to the method, the container is fed into a processing path in which at least one of the following method steps is carried out in an automatic manner: a) dissecting the container into a first portion and a second portion; b) removing the first and/or second closable access from the respective surface; c) removing at least one residual from the inside of the container; d) reducing the volume of the container by folding one surface of the container onto another surface of the container; and e) loading the container into a baler.

According to one aspect (first aspect) of the invention, the method of processing a used container is carried out in an automatic manner, so that the at least one method step is performed automatically, especially without interaction of a worker. Further, if at least two method steps are carried out, the term encompasses an automatic transport of the container, or parts or portions of the container between the two or more method steps.

According to another aspect of the invention which may be present in addition or as an alternative aspect to the first mentioned aspect of the invention, the method provides at least one method step, on which the invention can be based alone, i.e. providing reason for patentability itself. Some or all of the described method steps have not been considered before when processing a used container, especially a container according to the description.

According to another aspect of the invention which may be present in addition or as an alternative to the afore-mentioned aspects, large containers can be processed at a throughput of more than 30 containers, preferably more than 40 containers, preferably more than 45 containers, preferably more than 50 containers, preferably more than 55 containers per hour, which may result in a processing of more than 1,000 lbs, preferably more than 1,100 lbs, preferably more than 1,200, preferably more than 1,300 lbs, preferably more than 1,400 lbs, preferably more than 1,500 lbs, preferably more than 1,600 lbs, more preferably more than 1,650 lbs, most preferably more than 1,700 lbs, per hour.

The term "processing" encompasses a method step which is part of or a preparation for a reconditioning of the container, of the container's material and/or one of the container's elements. The term "processing" may encompass a transport of the container or parts or portions of the container to a processing station which preferably carries out a method step which is part of or a preparation for a reconditioning of the container. The term "processing" encompasses an interaction with the container or parts or portions of the container, especially a cleaning and/or destruction of the container or parts or portions of the container. The term "destruction" encompasses at least one of the following actions: cutting, removing, tearing, reshaping, converting, folding (down), crushing etc., it can be considered a transformation or deconstruction of the container to reduce volume, weight and/or integrity/stability of the container.

The term "processing" may encompass providing a processing path, especially when at least two processing stations or two method steps are considered.

The term "container" encompasses any box, reservoir or receptacle that is, can be or was filled with a liquid, semi-liquid and/or solid. The term "container" especially encompasses a container having a rigid wall. The container may have any shape. The container may be of cubic-shape, cuboid-shape, cylinder-shape (especially generalized cylinder-shape) or a combination thereof. The container may have flat, rounded or otherwise structured surfaces. The container may be formed of any material or material composition. The material forming the container may comprise metal, plastic, composite material or combination thereof.

When processing of the container is described in the specification, this includes the processing of portions or parts of the container, especially when the container is dissected into respective portions or parts and these portions or parts are processed. Mutatis mutandis, if the processing of only a part or portion of the container is described, the processing of such part shall also mean a processing of the container. When the present specification describes loading of the container into a baler, this also refers to a loading of a portion or a part of the container into the baler. Therefore, the term "container" encompasses the whole container and the portions and parts of the container which, especially, result from a method step described herein.

In a preferred embodiment, the container is a container for use in shipping, storing, and dispensing a liquid, a semi-liquid fluid or a solid (bulk cargo, for example in the form of granulated or powdered material), which is used as an inner container or bottle in a "bottle and cage" arrangement. The "bottle and cage" arrangement is also known as pallet container or "Intermediate Bulk Container" (IBC). The pallet containers are used for storing and for transporting, in particular liquid, semi-liquid or bulk material, which may be hazardous and which may be used in the chemical industry. The bottle or inner container may have a capacity in the range between 800 liters to 1,300 liters, especially between 900 liters to 1,200 liters, preferably approximately 1,000 liters. The bottle or inner container may have at least one of the following dimensions: a length (especially from a front surface to a rear surface) between 1 meter to 1.5 meter, preferably approximately 1.2 m, a width (especially from a side surface to another side surface) between 0.8 meter and 1.2 meter, preferably approximately 1.0 m, and a height (especially from a bottom surface to a top surface) between 0.8 meter and 1.3 meter, preferably approximately 1.1 m. The bottle or inner container can be produced from any plastic, composite material or combination thereof. The material of the container can be a thermoplastic, especially formed by blow molding.

The term "used" encompasses that the container had been filled before. The term "used" can mean that a residual is present in the container.

The term "container wall" encompasses any shape of wall. The container wall may be flat or rounded and/or the container wall may comprise a structure at the outer and/or inner side of the respective surface. The container wall may be of any material or material composition. The container wall may be made of metal, plastic, composite material or a combination thereof. The container wall may comprise layers comprising different materials, especially different plastics.

The term "surface" encompasses any surface or area of the container that may be associated with the outer surface or area of the container's shape. By way of an example, if the container is of cubic-shape or cuboid-shape, the container comprises a top surface, a bottom surface, two side surfaces, a front surface and a rear surface. By way of an example, if the container is of cylinder-shape, the container comprises a top surface, a bottom surface and at least one side surface (in case the cylinder base has a round shape). If the cylinder base is a polygon, the container comprises a top surface, a bottom surface and several side surfaces, wherein the number of side surfaces is equal to the number of lines forming the polygon.

As the container is dissected and/or transformed during processing, the term "surface" encompasses not only the whole surface of a container in use but also portions of the surface. For example, when the container is dissected into two portions, one portion comprising the top surface and the other portion comprising the bottom surface, each of the portions may comprise at least a portion or section of the front, rear and side surface. The portions of the surfaces are referred to as "the surfaces".

Spatially relative terms, such as "length", "width", "height", "top", "bottom", "side", "front", "rear" and the like, may be used herein for ease of description to describe the relationship of one element or feature to another element(s) or feature(s) as especially illustrated in the figures and with regard to the container when in use, i.e. the container is filled and the container is in usual use. Spatially relative terms may be intended to encompass different orientations, especially of the container when transported during the processing or when the method step is carried out. For example, if the container or part or portion of the container is turned over, elements described as being on "top" would then be oriented as being at the "bottom", however, in the description, the spatially relative terms are used as if the container rests on the bottom surface in normal use.

The term "plane" encompasses two directions in which the plane may extend. A plane can describe a surface of the container; a structure or rounding of the surface is negligibly.

The term "opening" encompasses a hole formed in the container wall or in a surface of the container through and via which the container may be filled or emptied out.

In a preferred embodiment, the container may have an opening at the top surface. In a further preferred embodiment, which may be an alternative embodiment or a combination with the afore-mentioned embodiment, the container may have an opening at a side or front surface, especially in an area spaced apart from the top surface. Especially, when the container is an IBC, one opening may be in the top surface and one opening may be in the front surface near or adjacent to the bottom surface.

The term "closable access" encompasses the possibility that the opening can be selectively closed and opened. In a preferred embodiment, an opening can be adapted to be an outlet or an inlet. The outlet, which is especially formed at a side surface or front surface, can be adapted as a nozzle or valve having an element or member that can be actuated to open or close the outlet.

The term "processing path" encompasses a path along which stations or devices can carry out method steps described in the description and the claims. The container or part or portions of the container can be transported between the stations or devices that can carry out the method steps. The processing path may have branches. For example, one portion of the container may undergo a different processing than the other of the two portions. The branch or feed to another processing station may include an angle between the two branches, especially an angle of substantially 90°, so that the processing path that feeds one of the two portions to at least one processing station is arranged at an angle of 90° to the processing path that feeds the other portion to at least one different processing station. The term processing path encompasses the possibility that a container enters the processing path at the feeding station or entrance of the processing path and that an end station, especially a baler, is provided for all the portions of the container. The end station, especially the baler, can process different portions of the container. Thus, even if branches are present in the processing path to process different portions of the container, only one end station, especially a baler, may be required. The processing path may have one beginning and one end at which the processed container can be received by a worker.

The term “transported” or “transportation” encompasses that the container is moved to or near to a station or a device that can carry out at least one of the described method steps. The container can be transported by a conveyor system (comprising a belt, chain or a combination thereof), transportation rollers and the like. The member(s) or element(s) used for transportation may comprise a motor or drive adapted to drive respective elements to transport the container. Further, the transportation may comprise a transport of the container induced by gravity force, for example on a sloped or inclined support. In addition or as an alternative, the container may be transported near to or adjacent to the processing station by a conveyor system and once near to or adjacent to the processing station, the container is transported by a member or an element of the processing station itself. It is also possible that the containers are moved by pushing or transporting one container in a line of containers and the containers are transported together as the one container which is transported applies a force for movement to the other containers.

The term “fed” or “feeding into the processing path” encompasses providing the container at a certain position, for example an entrance, especially by a user or worker. From the position (“feeding position”, “entrance”) the container can be transported or conveyed to at least one station or device which can carry out at least one of the described method steps. Preferably, placing the container at a certain position (the “infeed position”) may comprise orienting the container according to a certain orientation, i.e. on which surface the container rests and/or which surface is to the left or the right when in feeding position. The container may be oriented especially in an orientation which corresponds to the orientation of the container during normal use. In a preferred embodiment, the container can be oriented so that the top surface is on top and the bottom surface is the surface on which the container rests. In case the base (bottom surface) of the container has different extents in the two dimensions of width and length, the support at the certain position for feeding the container can have a mechanical restraint or barrier that only permits feeding the container into the processing path by orienting the container so that the usual front surface of the container is oriented correctly, i.e. to the left or to the right, facing towards the user or away from the user.

A mechanical restraint at the “entrance” or point of feeding of the processing path offers the possibility that the elements or surfaces of the container are oriented in the specific manner without requiring determining the positioning of the openings of the container or the top and/or bottom surface. The number of sensors required may be reduced as well as the costs for the sensors can be kept low.

The term “automatic manner” encompasses the possibility that the method step(s) is/are carried out without manual intervention or manual interaction of a worker. In case more than one of the method steps are carried out, the automatic manner can include transportation or movement of the container or portions or parts of the container between stations or devices that carry out the method steps without requiring a worker’s manual interaction. In a most preferred embodiment, some or all of the method steps may be performed without manual intervention by a worker, most preferably, the container is fed into a processing path (which may be a processing line or lane) and at the end of the processing path, a worker can receive or remove a bale from the baler; the bale may be positioned on a pallet and can be handled by a forklift.

In a preferred manner, the term “automatic means” includes the use of at least one robotic means or robot. The term “robotic means” or “robot” includes means capable of performing a complex series of actions automatically. The term “robotic means” or “robot” includes an industrial robot. The “robotic means” or “robot” may include the device that processes the container at a particular station. The “robotic means” or “robot” may include at least one sensor for sensing information about the container being processed; for example, the sensor may determine the position and/or orientation of the container. The use of “robotic means” or a “robot” offers the possibility of relying on known devices that can be programmed and/or otherwise adapted to perform the respective process.

The term “dissecting” the container encompasses cutting of the container into two portions or parts that can be further processed. In a preferred embodiment, one of the two portions (parts) comprises the top surface and the other portion comprises the bottom surface. Further, one of the two portions can comprise the first opening, which can be preferably in the top surface, and the other portion can comprise the second opening, which can be preferably in a side, rear or front surface. In a preferred embodiment, the dissecting is such that a cut or several cuts is/are carried out along the direction(s) in which the bottom surface and/or the top surface extend. The dissecting tool can be arranged horizontally.

The container may be automatically transported near to the station performing the dissecting step (dissecting station) and a pushing member, which may be especially different from the member feeding the container near to the dissecting station, pushes the container into and/or through the dissecting station. A dissecting tool provided in the dissecting station may be stationary, wherein the container is moved against the dissecting tool. The movement or transport of the containers can be decoupled from the movement in the dissecting station. Preferably, the pushing member pushes the container in a different direction than the direction in which the container was transported near to the dissecting station. A simple arrangement of the dissecting tool can be provided without providing any movement of the dissecting tool and/or the transport member transporting the container near the dissecting station. The container may be fed or transported very easily by the pushing element which can apply a force to the container.

Preferably, the container may be transported near to the dissecting station in a direction substantially perpendicular to the direction in which the container is moved in the dissecting station.

The container may be dissected into two portions by a cut or cuts in substantially one plane. When the container is of cubic-shape or cuboid-shape, the side surfaces and the rear and front surface can be cut in a direction or plane parallel and along the circumference of the top and/or bottom surface. In a preferred embodiment, the container is dissected into two portions (parts) having different heights; preferably the portion comprising the top surface, is at least two times larger in height than the portion comprising the bottom surface. In a preferred embodiment, the two portions each comprise at least sections of side surfaces as well as the front and/or rear surface of the container.

The dissecting of the container can be easily adapted to different containers by adapting the heights of the dissecting tool and the mechanical restraints at the feeding of the container into the processing path.

Preferably, the dissecting station provides two supports for the two portions of the container, preferably a top portion and a bottom portion. In a most preferred embodiment, the bottom portion still rests on the respective support the container has been dissected. The dissecting tool may be a bandsaw. In the direction of transport of the container in the dissecting station behind the dissecting tool, a further support is provided on which the top portion may rest after the container has been dissected and the further support may be arranged substantially at the same height as the dissecting tool.

Behind the dissecting station, the processing path may diverge so that two branches are provided, one branch for one of the two portions.

The term "removing" the first or second closable access from the surface encompasses that the access, for example formed as a nozzle or valve, which is considered to be one of the more valuable elements of a container, can be removed as a whole. The step of removing the closable access may be carried out in an access removal station, preferably comprising an access removal tool. Removal of the access may provide an additional or easy increased access to the portion of the container. Preferably, "removing" encompasses removing a section of the surface in which the access is provided. Preferably, "removing" encompasses removing a section of the surface adjacent the surface in which the access is provided. Thus, when an access is provided at a front or side surface near the bottom surface, a portion of the surface above the access as well as a section of the bottom surface near the access is removed. It may be possible that the whole surface above the access is removed. "Removing the access" enables generating an opening in the bottom surface in the same step which is used to remove the access.

Eventually, the nozzle or valve can be removed without destroying it. This enables reuse of this part or element of the container, especially after cleaning. The closable access can be separated from the respective surface.

Preferably, the container may be held in place when the closable access is removed so that the interaction of the container with the access removal tool is not disturbed and carried out in a predetermined manner. Preferably, at least one clamping element engaging with a surface of the container is provided. The clamping element(s) engage(s) with the container and hold(s) it in place.

Preferably, the step of removing the closable access is done for the portion that comprises the bottom surface.

The term "removing a residual from the inside of the container" encompasses that at least one inner surface can be substantially cleaned or squeegeed of the residual. The residual may be removed in a residual removal station. Preferably, the inner surface corresponds to the bottom surface of the container on which the container stands. When the container is placed in normal use direction into the processing path, the residual content will be collected on the inner side of the bottom surface. The removing encompasses a scratching, scraping out and/or squeegeeing from the inside to squeegee or wipe the residual from the inside out of the container. The removing of the residual can be done by a wiper or squeegee tool that is kept or pressed in contact with the inside of the bottom surface and that is moved to wipe or squeegee the residual from the inside to an opening in the bottom surface.

To prevent the residual from running back onto the inner surface and to wipe off or squeegee a large amount of residual, the squeegee tool may be moved in a predetermined pattern or sequence of movements on the inner surface. The pattern or sequence of movements of the wiper tool may include a translational movement towards the opening from the side opposite or spaced apart from the opening in the bottom surface. After the translational movement, the wiper or squeegee tool may be rotated by an angle, particularly 90°, and further translationally moved toward the opening and wiping or squeegeeing at least partially across the opening, wherein when wiping or squeegeeing across the opening, the wiper tool may be additionally rotated, preferably in the opposite direction of rotation than the first rotation.

Preferably, the container is held in place when the residual is removed so that the interaction of the container with the wiping or squeegeeing tool is not disturbed and done in a predetermined manner. Preferably, at least one clamping element engaging with a surface of the container is provided. The clamping element(s) engage(s) with the container and hold(s) it in place.

Preferably, at least one of the method steps described above has been carried out in advance. If the container is already dissected into two portions, one comprising the top portion and one comprising the bottom portion, the portion comprising the bottom portion is the one that usually contains the residual and which has to be removed. The portion comprising the top portion usually does not have to be considered for removing the residual.

Preferably, the method step of "removing" the first or second closable access from the surface has been carried out prior to removing the residual, so that the residual can be scratched, swept or squeegeed through the respective hole or opening that is preferably formed when the closable access is removed.

Preferably, the residual removal station may further comprise a counter element. The wiping or squeegeeing tool can be relatively moved against the counter element to remove residual that is in contact with the wiping or squeegeeing tool. Preferably, the counter element can be positioned over the container or portion of the container at a position near the opening produced by the removing access tool.

Preferably, the residual removal station is situated adjacent the closable access removal station. Preferably, the processing path between a closable access removal station and a residual removal station is a straight line.

The term "reducing the volume of the container by folding one surface of the container onto another surface of the container" encompasses that one surface of the container is folded down or pressed or pushed to contact at least partially another surface of the container. By pressing or applying a pressing force to a respective surface, this surface can be folded or pressed at least partially in contact to another surface. Preferably, this folding or pressing is carried out for more than one surface, especially two surfaces, three surfaces and four surfaces that are folded onto a surface adjacent to all of the surfaces being folded. Preferably, the surface onto which the other surface(s) may be folded is the surface on which the container or part or portion of the container rests. The term to "fold onto" encompasses that the surface is above the other surface, especially that the surface at least partially lies above the other surface.

The step of reducing the volume of the container is performed in a volume reduction station comprising pressing or folding members.

Preferably, the volume of a portion comprising the top surface may be reduced and the surface onto which the other surfaces are folded down is the top surface so that the side surfaces, the rear and the front surface may be folded onto the top surface. The step can begin with any of the surfaces adjacent the top surface. Preferably, the step of folding down further surfaces may continue with a surface adjacent the surface which was just folded down. By way of example, the step may begin with one of the side surfaces, the rear surface or the front surface being pressed so that its inner side contacts the inner side of the top surface. Further, the rear surface can be pressed so that its inner side contacts the outer side of the side surface already in contact with the top surface. Further, the second side surface can be pressed so that its inner side contacts the outer side of the rear surface already in contact with the side surface resting on the top surface. Further, the front surface can be pressed so that its inner side contacts the outer side of the second side surface. A controlled folding can be carried out which reduces the volume of the container for transporting it. The folding results in a collapsed portion, preferably the one comprising the top surface.

Preferably, if the dissecting step has been done to obtain two portions of the container, for example one portion comprising the bottom surface and the other portion comprising the top surface, the portion comprising the top portion has to be turned over or flipped so that this portion rests on the outer side of the top surface.

Preferably, the container is held in place when pressing or folding members interact with the container so that the pressing or folding is not disturbed and is done in a predetermined manner. Preferably, at least one clamping element engaging with a surface of the container is provided. The clamping element(s) engage(s) with the container and hold(s) it in place. Further, it is possible that an opening in the container may be used to hold the container in place. The opening may be one of the container's openings in normal use. A clamp or holding member can be inserted in the opening and a finger of the clamp or holding member can engage the inner side of the surface in which the opening is formed. Preferably, the surface may be the top surface of the container and the opening may be the closable access in the top surface. Thus, a structural element of the container may be used as an engagement or counter element.

The term "loading the container into the baler" encompasses that the container or portion or part of the container is loaded into a baler. Preferably, the baler is automatically cycled after loading an additional container or portion or part of the container so that the content of the baler is compressed or pressed together. The cycling of the baler may be controlled. The baler may be a two-ram baler comprising two cylinders. The baler can produce any shape of bale, wherein a cuboid-shaped or cubic-shaped bale is preferred. Preferably, the baler can compact the container or portions or parts of the container loaded into the baler. After a specific amount of material is compacted, the material may be tied to a bale by a wire or the like and then pushed out of the baler. The bale may be sent to a recycling company.

A computer, micro-processor or the like may control at least one or all of the method steps. Thus, the stations along the processing path as well as the conveyor systems may be automatically controlled. A display and an input device may be provided to allow interaction with a user to inform and/or select settings of the method steps and the transport of the container from and to a respective station carrying out the method step(s).

Although the terms first, second, etc. may be used herein to describe various portions, elements, components, parts, openings, surfaces, areas and/or regions, these portions, elements, components, parts, openings, surfaces, areas and/or regions should not be limited by these terms. These terms may be only used to distinguish one portion, element, component, part, opening, surface, area and/or region from another portion, element, component, part, opening, surface, area or region.

BRIEF DESCRIPTION OF THE DRAWINGS

The disclosed technology will be explained and described in more detail below with reference to an exemplary embodiment which is illustrated schematically in the drawings, in which.

DETAILED DESCRIPTION

Figure 1:
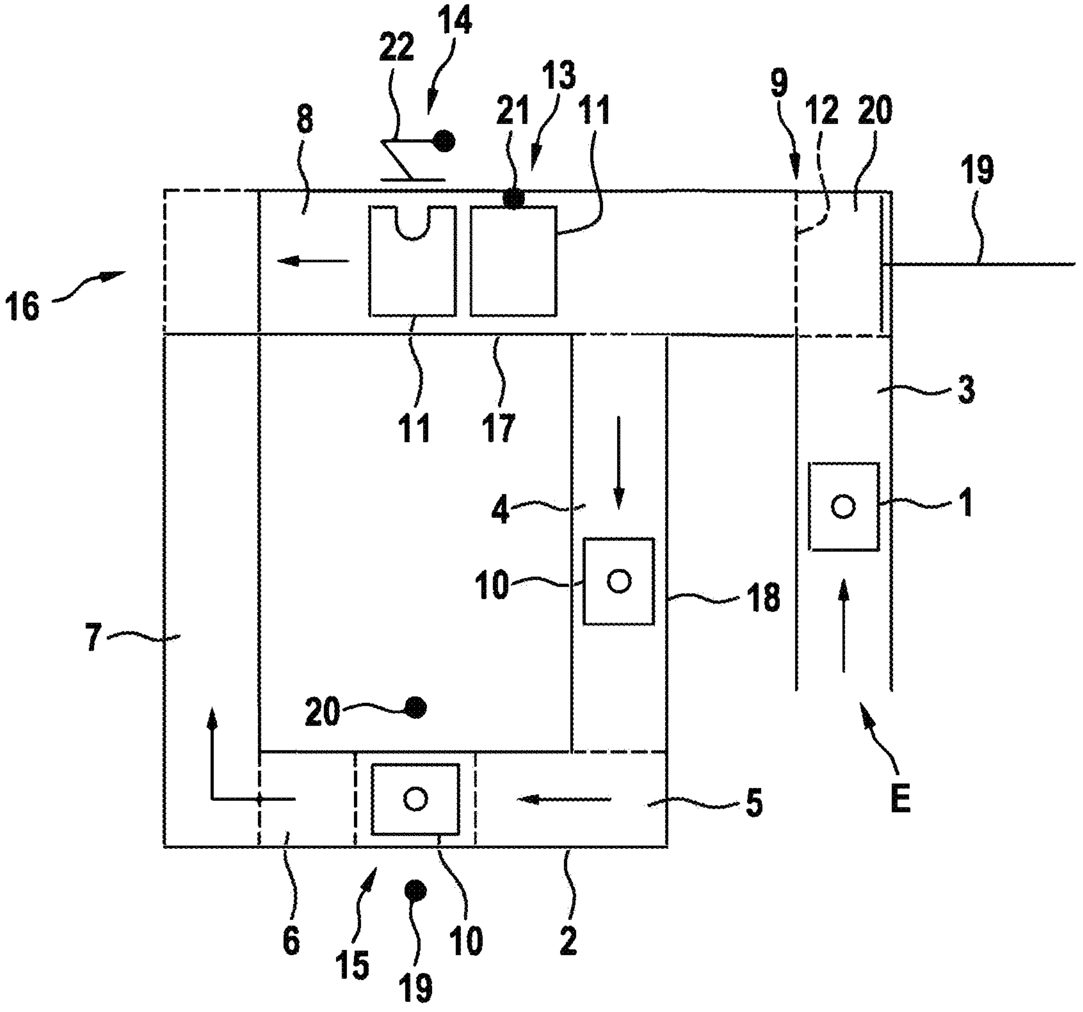
FIG. 1 shows a processing path of a container.
Figure 2A:
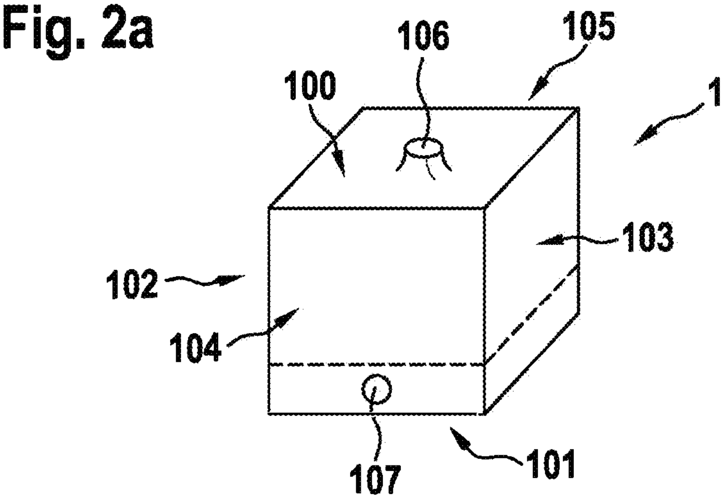
FIG. 2*a* shows a container processed in FIG. 1.
Figure 2B:
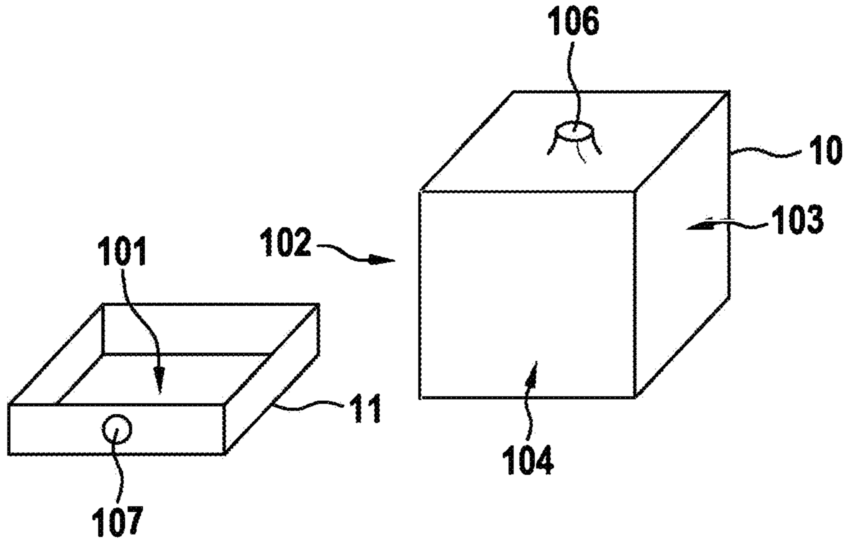
FIG. 2*b* shows a first and a second portion of the container after dissecting the container shown in FIG. 2*a;*
Figure 2C:
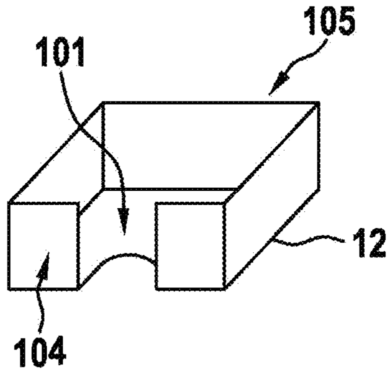
FIG. 2*c* shows the first portion of the container according to FIG. 2*b* after removing a closable access.
Figure 2D:
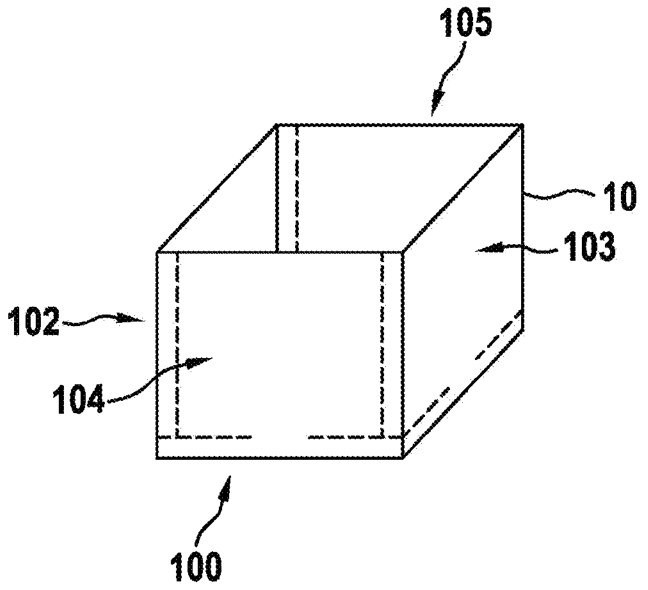
FIG. 2*d* shows the second portion of the container according to FIG. 2*b* and cutting lines in the second portion.
Figure 2E:
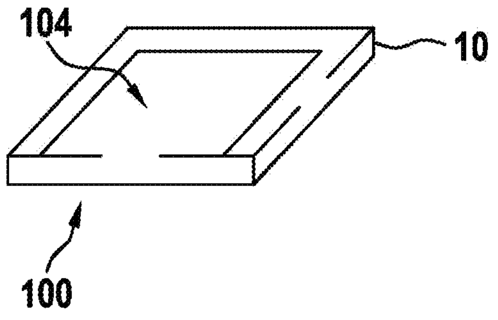
FIG. 2*e* shows the second portion according to FIG. 2*d* after folding surfaces of the container down the bottom surface.

FIG. 1 schematically shows a processing path 2 for processing a used container 1 which is in the shown embodiment a bottle of a bottle and cage arrangement.

The processing path 2 comprises conveying systems 3, 4, 5, 6, 7, 8 for at least partially conveying or transporting the container 1 along the processing path 2. Further, the processing path 2 comprises stations 9, 13, 14, 15, 16 for processing the container 1 and/or portions 10, 11 of the container 1.

The processing path 2 comprises an entrance E at which the container 1 can be fed into the processing path 2. Due to the dimensions of the entrance E the container 1 can only be oriented in such a way that the side surfaces of the container 1 extend in the direction of transport at the entrance E. A worker can place the container 1 onto the conveyor system 3 in such a way that the container 1 rests on the bottom surface and the front surface is oriented in the direction of transport (the outward pointing surface normal of the front side essentially coincides with the transport direction).

Schematically shown is a station 9 for dissecting the container 1 into a first portion 10 of the container 1 and a second portion 11 of the container 1. The station 9 comprises a horizontally oriented cutting tool 12 which is configured as a bandsaw. For moving the container into station 9 and through station 9, a pushing element 19 is provided. The pushing element 19 pushes container 1 against the cutting tool 12 after the container 1 has been transported near to or adjacent to station 9 which is depicted as position 20. Further, station 9 comprises a support on which the first portion 10 may rest during and after cutting.

The processing path 2 branches after station 9 for dissecting the container 1. In branch 18 the first portion 10 of the container 1 is processed and in branch 17 the second portion 11 of the container 1 is processed.

Branch 18 comprises the conveyor systems 4, 5 for transporting the first portion 10 of the container 1 adjacent or near to the station 15 for reducing the volume of the container 1 by folding one surface onto another surface of the container 1.

Before processing the first portion 10 in station 15, the first portion 10 is turned over so that the first portion 10 comes to rest on the top surface of the container 1. The first portion 10 of the container 1 is processed in station 15 by two arms 19, 20 which each comprise a cutting tool and a folding tool. The two arms 19, 20 substantially work in unison to cut the first portion 10 near the top surface as well in the corner area such that the surfaces of the first portion 10 of the container 1 can be folded onto the top surface. During the cutting and folding, the first portion 10 of the container 1 is held in place by a clamping element which is inserted from the bottom through the opening of the top surface of the container 1. One or two fingers of the clamping element are brought into contact with inner side of the top surface of the container 1.

The first portion 10 of the container 1 is transported from a position near or adjacent to the station 15 by the two arms 19, 20.

Branch 17 comprises the conveyor system 8 for transporting the second portion 11 of the container 1 adjacent or near to the station 13 for removing the first or second closable access from the respective surface of the second portion 11 of the container 1.

Station 13 for removing the first or second closable access from the respective surface comprises a cutting tool 21 which is adapted as a hole saw. The cutting tool 21 can be used to remove the closable access as a whole.

Next, the second portion 11 is transported to station 14 for removing at least a residual from the inside of the container 1. The residual is drawn off through an opening by means of a squeegeeing tool 22 at an end of a robot's arm. Here, the opening resulting from application of the cutting tool 21 in station 13 is used.

After station 15 and station 14, the first portion 10 and the second portion 11 of the container 1 are transported into station 16 which comprises a baler.

FIGS. 2*a* to 2*e* show a container 1 that is processed in the processing path 2 shown in FIG. 1. The container 1 is a container for use in shipping, storing, and dispensing a liquid, a semi-liquid fluid or a solid (bulk cargo, for example in the form of granulated or powdered material), which is used as an inner container or bottle in a "bottle and cage" arrangement. The "bottle and cage" arrangement is also known as pallet container or "Intermediate Bulk Container" (IBC). The container 1 is of cubic-shape or cuboid-shape, the container comprises a top surface 100, a bottom surface 101, two side surfaces 102, 103, a front surface 104 and a rear surface 105. The container 1 shown in FIGS. 2*a* to 2*e* has an opening 106 at the top surface 100. Further, the container 1 shown in FIGS. 2*a* to 2*e* has an opening 107 at the front surface 104, which is spaced apart from the top surface 100.

What is claimed is:

1. A container processing station configured to receive and process a container including a first closable access and a second closable access, the container processing station comprising:

a processing path extending between a container entrance and a container exit, the processing path having a first branch and a second branch different from the first branch;

a dissecting tool positioned along the processing path, the container being separable by the dissecting tool into a first portion having the first closable access and a second portion having the second closable access;

a folding arm adjacent the first branch and operable to fold the first portion, thereby reducing a volume of the first portion; and a cutting tool adjacent the second branch and operable to remove the second closable access from the second portion.

2. The container processing station of claim 1, further comprising a pushing element adjacent the dissecting tool and operable to push the container against the dissecting tool, thereby separating the container into the first portion and the second portion.

3. The container processing station of claim 2, wherein the dissecting tool includes a bandsaw oriented along a plane, and wherein the first portion and the second portion are oriented on opposite sides of the plane.

4. The container processing station of claim 1, further comprising a wiping tool adjacent the second branch and operable to remove a residual from an inside of the second portion.

5. The container processing station of claim 1, further comprising a flipping tool adjacent the first branch and operable to turn over the first portion to rest on a top surface of the first portion, the top surface containing the first closeable access.

6. The container processing station of claim 1, further comprising a first clamping element adjacent the folding arm and operable to selectively hold in place the first portion; and a second clamping element adjacent the cutting tool and operable to selectively hold in place the second portion.

7. The container processing station of claim 6, wherein the first clamping element is insertable into the first closable access.

8. The container processing station of claim 6, wherein the second clamping element is insertable into the second closable access.

9. The container processing station of claim 1, further comprising a conveying system operable to transport the container, including the first portion and second portion thereof, from the container entrance to the container exit, wherein the container exit includes a baler.

* * * * *